United States Patent [19]

Chen et al.

[11] Patent Number: 5,756,141

[45] Date of Patent: May 26, 1998

[54] METHOD FOR PRODUCING READY TO POUR FROZEN CONCENTRATED CLARIFIED FRUIT JUICE, FRUIT JUICE PRODUCED THEREFROM, AND HIGH SOLIDS FRUIT PRODUCT

[76] Inventors: Chin Shu Chen, 1823 Cypress Gardens Blvd., Winter Haven, Fla. 33884; William Apollo Chen, 1998 Pacific Ave., Apt. 306, San Francisco, Calif. 94109

[21] Appl. No.: 619,969

[22] Filed: Mar. 20, 1996

[51] Int. Cl.[6] .................. A23L 2/02; A23L 2/08; A23L 2/52; A23L 2/74

[52] U.S. Cl. .................. 426/599; 426/489; 426/521; 426/330.5; 210/651

[58] Field of Search .................. 426/599, 489, 426/330.5, 521, 271; 210/651, 650

[56] References Cited

U.S. PATENT DOCUMENTS

| | | | |
|---|---|---|---|
| 3,140,187 | 7/1964 | Bernt | 426/599 |
| 3,227,562 | 1/1966 | Houghtaling et al. | 426/599 |
| 3,799,806 | 3/1974 | Madsen | 210/651 X |
| 4,088,792 | 5/1978 | Bracco | 426/250 |
| 4,374,865 | 2/1983 | Strobel | 426/599 |
| 4,643,902 | 2/1987 | Lawhon et al. | 426/271 |
| 4,681,770 | 7/1987 | Palmer | 426/615 |
| 4,971,811 | 11/1990 | Strobel et al. | 426/50 |
| 5,110,472 | 5/1992 | Gresh | 210/651 X |
| 5,112,489 | 5/1992 | Hartmann | 210/637 |
| 5,206,047 | 4/1993 | Crandall et al. | 426/599 |
| 5,403,604 | 4/1995 | Black, Jr. et al. | 426/330.5 |

OTHER PUBLICATIONS

Tampa Tribune Newspaper dated Feb. 16, 1996, Power, "Minute Maid concentrates on Frozen", pp. 1 and 8.

Journal of Agricultural and Food Chemistry, vol. 40, No. 6, 1992, Hernandez, "Ultrafiltration of Orange Juice" pp. 986–988.

SOFW–Journal, 119, Jahrgang, May 1993, Pelley, "Current Status of Quality Control of Aloe barbadensis Extracts", pp. 255–268.

Citrus Industry, Feb. 1996, Hardy, What are we going to do about grapefruit?, p. 13.

Citrus Industry, Feb. 1995, Holland, "Scientists develop new orange syrup product", p. 20.

Fruit Juice Processing Tech. Nagy, et al (Eds), AgScience, Inc. Auburndale, FL 1993, pp. 200–209, 494–513.

Koch Membrane Systems, Inc.'s Sales Brochure, "Super–Cor Membranes Combine the Benefits of Open and Thin Channel Cross–Flow Filtration".

"Aloe Vera Products", Technical Reprint, DRAGOCO. A–1235 Vienna (1993).

Primary Examiner—Donald E. Czaja
Assistant Examiner—Jose A. Fortuna
Attorney, Agent, or Firm—Stephan A. Pendorf, P.A.

[57] ABSTRACT

A method for processing pulpy fruit puree or pulpy juice or reprocessing traditional evaporative pulpy citrus concentrate into products which do not resemble conventional juices or conventional concentrated juices, and more particularly, a packaged high Brix clarified juice concentrate which is ready to pour at freezer temperatures, to a 100% natural fruit juice produced from the clarified juice concentrate, to a blended reduced bitterness fruit juice product, and to a 100% juice-blend pulpy fruit product. The invention provides novel all-natural juice blends, including a 100% natural fruit juice containing aloe vera. The clarified juice concentrate as ready-to-pour 6+1 concentrates at freezer temperatures above −15° C. In contrast, the traditional 3+1 frozen juice concentrate becomes frozen at common domestic freezer temperatures of −5° to −15° C. and it is inconvenient to pour and to mix with water.

13 Claims, 1 Drawing Sheet

METHOD FOR PRODUCING READY TO POUR FROZEN CONCENTRATED CLARIFIED FRUIT JUICE, FRUIT JUICE PRODUCED THEREFROM, AND HIGH SOLIDS FRUIT PRODUCT

BACKGROUND OF THE INVENTION

1. Field of the Invention

The present invention relates to a method for processing pulpy fruit puree or pulpy juice or reprocessing traditional evaporative pulpy citrus concentrate into products which do not resemble conventional juices or conventional concentrated juices, and more particularly, to a clarified juice concentrate which is ready to pour at freezing temperatures, to a 100% natural fruit juice produced from the clarified juice concentrate, to a blended reduced bitterness and/or reduced acid 100% juice-blend clear fruit juice product, and to a 100% juice-blend pulpy fruit product. The invention makes it possible to eliminate "cooked" flavors from previously prepared conventional concentrates exhibiting cooked flavors. Finally, the invention provides novel all-natural juice blends, including a 100% natural fruit juice containing aloe vera.

2. Description of Related Art

The retail market for orange and grapefruit juices in the U.S. is estimated in the order of $3 billion annually. In the U.S., Florida accounts for more than 70% of orange and 80% of grapefruit production. About 94% of Florida's oranges are processed into juice products. Although fresh squeezed orange juice has long been considered the most preferred form of orange juice by the consumer, this product is difficult to handle commercially due to the large volume of the juice, which is mainly water, further due to the presence of enzymes (primarily pectinesterase) which would cause cloud loss in the juice or gelation of concentrates, and finally due to microorganisms which would cause fermentation and spoilage in the juice.

For economic handling, packaging, storage, and transportation on a commercial scale, orange and grapefruit juices are processed into a semi-finished product of frozen concentrated orange juice (FCOJ) and frozen concentrated grapefruit juice (FCGJ) at 58°–67° Brix. °Brix is a measure of the soluble solids in the juice in percent by weight. Of Florida's oranges which are processed into juice products, about 72% are for FCOJ production. Major retail orange juice products include FCOJ (42° Brix), ready to serve (RTS) chilled orange juice from concentrate (min. 11.8° Brix), RTS chilled juice not-from-concentrate (NFC, min. 11.0° Brix), and canned orange juice (min. 10° Brix). In each case, the object of the processing technique is to provide a concentrate which can be reconstituted to resemble pulpy fresh squeezed juice as closely as possible.

In the concentration process, pasteurization of citrus juices is required for two reasons: it inactivates the enzymes which would otherwise cause cloud loss in the juice or gelation of concentrates, and it destroys microorganisms which would otherwise cause fermentation and spoilage in the juice. The recommended temperature/time requirements for achieving commercial stability were 363.15 K for 1 minute. Typical commercial heat treatments vary from 368.15 K to 363.15 K for 15 to 60 seconds. Since the development of the TASTE (Thermally Accelerated Short Time Evaporator) system in the late 1950s, it has become a standard in the production of FCOJ in the citrus processing industry. The TASTE system combines pasteurization and high temperature, short time evaporation processes without recirculation to minimize the effect of temperature-time on quality degradation of the product.

While the TASTE evaporator is the citrus industry standard for concentrating orange juice, it does suffer certain problems. One of the problems with FCOJ is the loss of some desirable flavors during the evaporative concentrating process. Citrus juice contains volatile flavors and aromas that are heat-sensitive and subject to loss under conditions of thermal treatments such as those to which the juice is subject during pasteurization or the evaporative condensation process. That is, first, during evaporative concentration of orange juice, a significant portion of the aroma and flavor volatiles are removed with the water vapors. These volatiles consist of numerous aldehydes, esters, alcohols, ketones, organic acids, terpenes and sequiterpenes. This loss results in a significant deterioration in quality and overall flavor of the juice concentrate. Second, these volatiles can also undergo chemical alterations due to heating under the evaporative conditions and produce degradation products that can cause off-flavors in the juice product produced (frequently giving the reconstituted orange juice a "cooked" flavor). Further, pectin and pulp in the juice absorb aromas and flavor components which also contribute to lower display of aroma and flavor levels. Thus, the TASTE process suffers from the loss of certain natural flavors and the denaturing of other flavor compounds.

Since most of the aroma and flavor volatiles are removed with the water vapors, an essence recovery system is used in the TASTE system to collect the aroma and flavor compounds. Essence is the term applied to the first 20 to 25% of the water which is removed through evaporation and which contains a significant amount of volatile aroma and flavor. These captured compounds can be returned to the concentrate. Even when these compounds are returned, the final product does not fully resemble fresh squeezed juice. Therefore, cold pressed peel oils and flavor packs are used to restore the natural flavors for reconstituting evaporative concentrate to single strength ready-to-serve orange or grapefruit juice for consumption. See J. B. Redd, D. L. Hendrix and C. M. Hendrix, Jr., "Quality Control Manual for Citrus Processing Plants", AgScience, Inc., 1992, pp. 357. Illustrative of the previously used methods for concentrating citrus juices are those described in U.S. Pat. Nos. 4,938,985; 4,886,574; 3,366,497; 3,248,233; 3,072,490; 3,071,474; 2,588,337; and 2,500,670.

As departure from the TASTE system, Lawhon et al (U.S. Pat. No. 4,643,902) describe the use of ultrafiltration to separate juice into an ultrafiltration permeate and retentate. The permeate is described as a clear serum which contains flavor and aroma components, and the retentate is described as containing the spoilage microorganisms. The permeate is concentrated by reverse osmosis to levels above 42° Brix. The retentate is treated to inactivate the spoilage microorganisms, and the retentate is then recombined with the permeate. The reconstituted juice is claimed to have a quality close to fresh juice. Based on the Lawhon et al patent, Cross (1989) describes a commercial design of an ultrafiltration-reverse osmosis process for membrane concentration of orange juice.

In the processing of clear juices from various berry fruits such as strawberries, raspberries, blackberries, and banana other than citrus fruit, specific kinds of fruit require specific kinds of processing prior to juice extraction or pressing, e.g., treatment with enzymes to achieve as complete a separation of the juice from the cell tissue as possible. Pre-heating to ca. 50 degree C. for approximately one hour is required for the denaturation of semipermeable cell membranes that facilitates extraction of cell juice. Along with subsequent treatment of maceration enzymes, this helps to achieve a greater juice yield during pressing. Thermal treatment inactivates the enzyme anthocynase, and the denaturation of the membranes enclosing the vacuoles (in which the anthocyanin are located) make it possible for more of the pigments to pass through. The negative effect of heating is to degrade the flavors and color. See Steven Nagy, Chin Shu Chen, and Philip E. Shaw (Eds.), "Fruit Juice Processing Technology", AgScience, Inc., 1993, page 495, FIG. 12.3. In addition, the conventional clear juice processing technique is expensive in terms of enzymes, it requires that the juice be maintained at a temperature of 50° C. for one hour, and it produces solid by-products which have no known commercial value and are difficult to dispose of. The technique of enzyme treatment is not permitted for citrus juice processing.

Previously, fruit juices have been separated by ultrafiltration into clarified and retentate fractions in order that the clarified fraction may be debittered by a membrane-adsorption technique. Such a technique has been applied to debittering navel orange juice and grapefruit juice and to upgrading pulpwash. The debittered clarified permeate is then recombined with the pulpy retentate to restore the color and juice characteristics for traditional pulpy juice production. However, the debittering resin, in addition to adsorbing bitter limonin and naringin, also adsorbs flavor and color compounds. Thus, the adsorption-debittering process suffers a loss of flavors and natural color. Further, the process of debittering using such a resin is expensive and cost-prohibitive for commercial processing of prime grapefruit juice.

Investigations by the present inventor and others into the composition of the ultrafiltration permeate and retentate fractions prior to recombining was reported in Hernandez, E., Chen, C. S., Shaw, P. E., Carter, R. D., and Barros, S. M. (1992) "Ultrafiltration of Orange Juice: Effect on Soluble Solids, Suspended Solids, and Aroma." J. Agr. Food Chem. 40(4): 986–988. There is disclosure of ultrafiltration of fresh squeezed, pasteurized, and finished Valencia orange juice to form a clarified serum permeate and a pulpy retentate. The permeate was concentrated in a three-effect four stage pilot TASTE evaporator. No PME (pectin methyesterase, an enzyme important in effecting the stability of the suspended solids in orange juice) activity was detected in the permeate. The viscosity of the concentrated permeate was appreciably lower than that of concentrated fresh orange juice which had not been subject to ultra-filtration. Reduction in viscosity allowed the TASTE evaporator to concentrate the orange juice permeate to higher °Brix (72°–75° Brix) than possible for the untreated juice (concentrated to 56°–58° Brix). Some aroma compounds, such as hydrocarbons and less polar compounds, were found to remain in the retentate, while others, particularly the more fruity aroma compounds such as the oxygenated aroma compounds such as alcohols, esters, and aldehydes, were found to pass through the ultrafiltration membrane to the permeate. The study of the distribution of aroma components during the ultrafiltration stage was considered to be important for the understanding of what was occurring in the retentate and the permeate as these were processed separately, e.g., in pasteurizing and debittering treatments, prior to recombining to form a pulpy juice.

Another significant disadvantage associated with frozen concentrated orange juice is the inconvenience in making juice from frozen concentrate. Conventional 3+1 (3 parts of water plus 1 part of concentrate) FCOJ or FCGJ becomes frozen at freezer temperatures around −5° to −15° C. The consumer, desiring to drink juice, must first remove a can of frozen juice from a freezer and allow it to thaw sufficiently to be able to expel a solid lump of concentrate from the can. Next, the frozen solid lump of concentrate must be stirred in water for a time until it thaws and blends. Presumably as a result of the time and inconvenience, the market share of frozen concentrate orange juice has been continuing to decline in the past decade. It now accounts for only about one third of the retail market or approximately US $700–800 million.

In comparison, pasteurized not-from-concentrate (NFC) chilled juice has experienced a steady increase in market share in the past several years due to its ready-to-drink condition and improved flavor over juice reconstituted from concentrate. The consumer thus desires to have a fruit juice which is easy to prepare and does not require thawing of frozen concentrate. However, due to the bulk in comparison to concentrate, such a product is commercially less preferred, and more than 70% of the retail orange juice products are still made from frozen juice concentrate by reconstitution with water and the addition of natural orange flavors and aromas.

Grapefruit juice, while considered nutritious and healthy, has a bitter aftertaste. It is this aftertaste which presumably accounts for the lower popularity and price of grapefruit juice as compared to orange juice. It would thus be advantageous to develop a process by which a juice product could be produced economically which does not have this undesirable bitterness. Some debittering processes are known, but they add significantly to the cost of the final product and are thus cost-prohibitive on a commercial scale. It can be expected that the popularity and value of a debittered grapefruit juice would rival that of orange juice.

Another disadvantage of the fruit concentrating process is that the concentrate, made from the pulpy juice, is frequently different in color from the color of the skin of the fruit. A consumer will expect a fruit juice to have the fruit skin color. For example, it is desirable for strawberry juice to have a bright red color and banana juice to have a yellow color. However, juices produced by conventional methods tend to have the color of the pulp part of the fruit rather than the skin part. That is, strawberry juice prepared from pulp tends to have a light color. There is thus a need for a concentrated fruit juice product which has a color corresponding to the skin color of the fruit.

All attempts prior to this invention have been confined in the traditional thinking for producing better tasting orange juice or grapefruit juice that resembles to the taste of fresh squeezed juice. It is an objective for this invention to describe a method and system for producing nonconventional and clarified citrus juice which is ready to pour even at domestic freezer temperatures and which, upon reconstitution with water to a natural strength, has a desirable natural fruit skin color.

SUMMARY OF THE INVENTION

It is an object of the present invention to provide a method for producing a nutritious high Brix, low viscosity concentrated fruit juice concentrate product which is high in soluble solids concentration yet has low viscosity. It is a further object of the invention to provide a highly concentrated fruit juice concentrate which does not freeze at freezer temperatures, and which when at freezer temperatures is ready to pour and readily mixes with water.

It is a further object of the invention to develop a fruit juice produced by a non-enzymatic method which processes fresh juice, pulpy fruit puree, or concentrate juice into a clarified fruit juice concentrate and then readily reconstitutes this concentrate into a colorful 100% fruit juice.

These and other objects of the invention are accomplished by a process in which ultrafiltration is employed at ambient temperatures to separate a fresh juice, pulpy fruit puree, or previously concentrated juice into a suspended solids rich retentate fraction and a clarified juice fraction. No enzyme pretreatment is needed for separation. The retention of flavors and color pigments in the retentate is considered as a value-added objective of this invention since both retentate and clarified juice are used for total utilization of raw material. Thus the amount of juice yield is not a critical parameter for processing operation that is a radical departure from the conventional process design.

Ultrafiltration technique is applied to separate puree or nectars or reconstituted juice to separate suspended solids and clarified juice. The clarified juice is then concentrated to 60°–78° Brix, preferably 65°–78° Brix, most preferably 68°–72° Brix, and stored at conventional tank farm temperatures of −5° to −10° C. The clarified jucie according to the present invention is novel in it's ability to be stored under such temperatures in that a juice must be capable not only of remaining in the tank, but of being pumped at such temperatures. The clarified juice concentrate is reconstituted with water to produce a fruit juice having a natural skin color. The clarified juice is low in aromatic compounds, particularly hydrocarbons and less polar compounds, and more particularly so if the clarified juice is prepared by reprocessing traditional evaporative pulpy citrus concentrate.

It is a surprising discovery that the clarified juice fraction, even when prepared from reconstituted traditional evaporative pulpy citrus concentrate and having cooked flavors, does not exhibit the cooked flavors. Rather, it has a clean, refreshing, sweet flavor which can be prepared and consumed as a juice or combined with other juices and/or with aloe vera or other ingredients and then consumed.

Conventionally, a retentate fraction in a commercial evaporative condensation process is a non-edible waste product which is disposed of only with difficulty. Surprisingly, the retentate according to the present invention is a sugar-reduced puree that is useful as a low calorie food ingredient either in the form of a puree, a semi-dried paste, or a powdered solid. Since the retentate is edible, the problem of waste disposal is eliminated. For citrus products, the retentate can be blended with clarified banana juice, for example, orange-banana or grapefruit-banana. These products will have the same amount of pulp as natural orange or grapefruit juice and are different from the traditional multi-fruit juice blend which has too much pulp.

Even in the case of preparing the concentrate from a previously pasteurized fruit juice, it was found that both retentate and filtrate quality do not degrade and both retain natural color and flavors.

The process thus produces a clear juice fraction without the conventional expensive enzyme treatment, and thus it does not require temperature holding at 50° C. for one hour. The non-conventional clarified citrus juice and retentate have different characteristics from the standard of identity of pulpy citrus juice. Therefore, all the wholesome fruit can be processed including off-grade fruit such as those which have been damaged by frost or those which do not meet the maturity standards.

Most particularly, the present inventor was first to discover that the clarified orange or grapefruit, which had conventionally merely been separated out so that the clear juice could be treated for de-bittering or de-acidification (while the retentate was treated to inactivate microorganisms and enzymes), followed by recombining of the clear juice and retentate fractions to form a pulpy juice product, may instead form a commercially desirable clear juice concentrate (i.e., without recombining with the pulpy fraction) which by itself has significant desirable storage, handling, fruit color, and taste properties. More especially, the technology can be generally applied to both citrus and non-citrus fruit and vegetable material, thus it increases the economic value of the present invention.

The features that characterize the invention, both as to organization and method of operation, and the products produced thereby, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
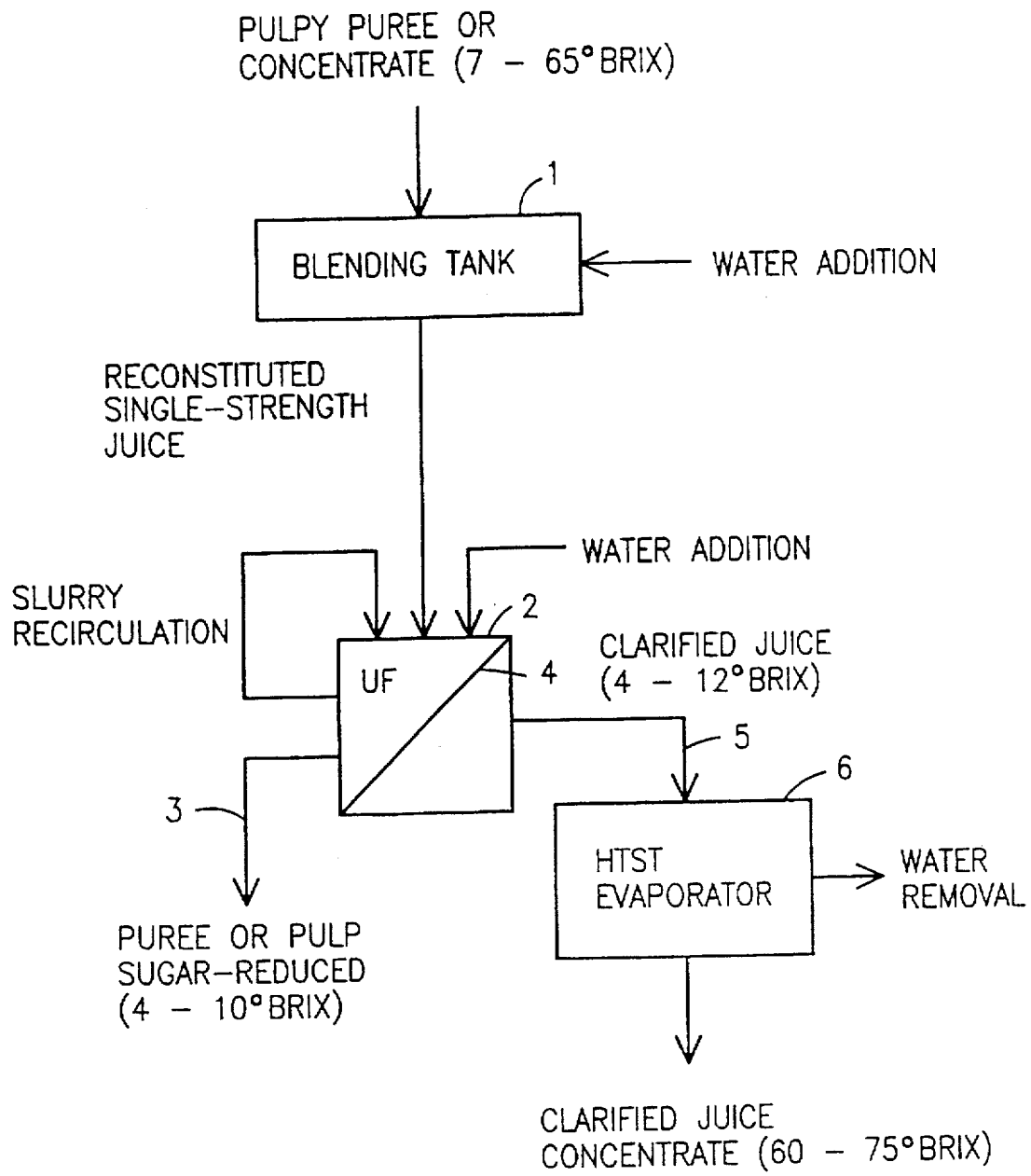
FIG. 1 is a flow sheet diagram of the process according to the present invention comprising ultrafiltration technology to produce a sugars-reduced fruit puree retentate as well as a clarified and colorful fruit juice permeate.

A description of the preferred embodiments of the present invention will now be presented with reference to FIG. 1.

FIG. 1 is a general flow diagram the system and method of the present invention. Details which are mere operating parameters which are readily within the skill of those working in the art to select are omitted from the diagram so as not to unnecessarily complicate the diagram. Details of ultrafiltration equipment and process parameters to produce permeate and retentate fractions can be found in Hernandez, E., Chen, C. S., Shaw, P. E., Carter, R. D., and Barros, S. M. (1992) "Ultrafiltration of Orange Juice: Effect on Soluble Solids, Suspended Solids, and Aroma," J. Agr. Food Chem. 40(4): 986–988, which is incorporated herein in it's entirety.

One advantage of the present invention is the ability to produce concentrated fruit juice from previously processed concentrated juice. If made from a puree or concentrate, the clarified juice can be reconcentrated by a high temperature short time evaporator to a higher degree of concentration than that of the original puree or concentrate. The ability to start from a conventionally prepared concentrate is a distinct advantage over other processes which require fresh squeezed orange juice as starting product, since the availability of fresh orange juices fluctuates seasonally. Thus, the present invention makes is possible not to have to process all fresh fruit at peak season, but rather permits preprocessing fruit into juice and then continuously reprocessing fruit juice over the year as needed. In this way, equipment idle time is avoided and the cost in processing equipment may be reduced by about 70% for the same plant capacity. Further contributing to the advantage of reprocessing in accordance with the present invention is the ability to eliminate cooked flavors present in the conventionally prepared concentrate. This feature will be discussed in greater detail below.

In the case of beginning with a concentrate, in a manner well known in the art the puree or juice concentrate is reconstituted to a single-strength juice in a vessel. The reconstituted single strength juice enters the system and proceeds through an ultrafiltration system at ambient temperatures, which separates the feed into two product streams; one is a pulpy stream and the other is a clarified juice stream. As a result, both retentate and filtrate retain natural color and flavors. This process scheme totally eliminates conventional pre-filtration, diatomaceous earth filtration, enzyme treatment, and centrifuging steps found in conventional process for producing, e.g., strawberry juice and other clear fruit juices.

With reference to FIG. 1, in the case of beginning with a concentrate, in a manner well known in the art the puree or juice concentrate is reconstituted to a single-strength juice in a blending tank 1. The reconstituted single strength juice enters the system and proceeds through an ultrafiltration system 2 at ambient temperatures, which separates the feed into two product streams; one is a pulpy stream 3 comprising materials which do not pass through the ultrafiltration membrane 4 and the other is a clarified juice stream 5. The permeate stream 5 is communicated to an evaporator such as a high temperature, short time evaporator 6, where the clarified juice may be highly concentrated for storage, or somewhat less concentrated for packaging and retail sales. As a result, both retentate and filtrate retain natural color and flavors. This process scheme totally eliminates conventional pre-filtration, diatomaceous earth filtration, enzyme treatment, and centrifuging steps found in conventional process for producing, e.g., strawberry juice and other clear fruit juices.

The clarified juice process and concentration method of the present invention are based on a viscosity reduction technique by separating the juice into pulp (high in suspended solids and thus high viscosity) and clarified juice (high in dissolved solids but low viscosity) portions. It is known in the art that the rheological (that is, material deformation and flow) properties of the pulp slurry and the clarified juice are very different from the regular pulpy juice. The removal of substantially all of the suspended solids in fruit puree or pulpy citrus juices (non-Newtonian fluids at high concentrations; a Newtonian fluid is one in which the state of stress at any point is a linear function of the time rate of strain at that point) by ultrafiltration (UF) results in changing the rheological behavior of the clarified juice to a Newtonian fluid, which facilitates the ease of evaporative concentration of the clarified juice.

An ultrafiltration system manufactured by Koch Membrane Systems, Inc. (Wilmington, Mass.) may be used. However, it will be understood by those skilled in the art that any of the well-known ultrafiltration or micro filtration units may be utilized. The membrane unit was used to produce clarified juice permeate and pulp streams. Suspended solids in the juice are removed as the retentate fraction. In accordance with the present invention, the pulp acts as a filter-aid in that it adsorbs or retains the undesirable cooked flavors, thus, the separation out of pulp (suspended solids fraction) makes it possible to produce clarified juice (permeate) that retains natural color of the fruit without the cooked flavors.

The membrane may be selected to either pass flavor and aroma components to the permeate, or to retain flavor and aroma components in the retentate. In either case, it is preferred that the membrane pass soluble solids such as sugars and soluble color compounds with the permeate. The molecular weight cutoff (MWCO) of the membrane is preferable in the range of $5 \times 10^4$ to $1 \times 10^5$. The pore size is sufficiently large for soluble color components to go through the membrane and it is also sufficiently small enough to retain pectin, other suspended solids, and microbes as needed for permeate clarification. Therefore, the clarified juice tends to have the natural skin color of the fruit being processed. The sugars content in the pulp fraction is substantially reduced, making the pulp fraction useful as a filler or additive for low calorie dietary foods preparation.

The clarified juice contains soluble solids, primarily sugars, minerals, acids, vitamins, soluble color substances, and water. It thus has a significant number of the appealing and nutritional components of the original fruit which are desired in a healthy juice.

The clarified juice permeate may then be subjected to any of the well-known high temperature short time (HTST) evaporative concentration systems, such as a multiple-effect evaporator, with a multiple-effect, multiple-stage falling-film type being the preferred technique. This clarified juice can be continuously concentrated at a higher rate of evaporation for a longer time, and can be concentrated to a high density, i.e., to ca. 65°–75° Brix (see Table 1). Removal of suspended solids by ultrafiltration reduces by approximately two-thirds of the viscosity of juice concentrate.

A surprising property of the high density yet reduced viscosity concentrate is that it makes it possible to prepare a concentrated juice that it will not freeze at conventional household freezer temperatures in the way that conventional concentrated orange juice will freeze. Thus, rather than requiring thawing before it can be extracted from a can, the concentrate is ready to pour directly from the freezer. This convenience factor is a significant feature of the present invention.

The properties of various fruit juice concentrates produced in accordance with the present invention are compared with conventional pulpy juice concentrate in Table 1.

TABLE 1

A comparison of typical solids content of conventional pulpy juice concentrate and clarified juice concentrate.

| Products | Initial feed °Brix | Final product °Brix |
| --- | --- | --- |
| Pulpy banana puree | 8–10 | 22–23 |
| Clarified banana juice | 7–9 | 65–70 |
| Pulpy citrus juice | 10–12 | 60–65 |
| Clarified citrus juice | 9–11 | 65–75 |
| Pulpy strawberry puree | 7–9 | 20–22 |
| Clarified strawberry juice | 6–8 | 60–65 |
| Clear Aloe-orange-banana juice | 12 | 65–70 |
| Clear Aloe-grapefruit-banana juice | 10 | 65–70 |

Frozen concentrated clarified grapefruit juice (FCCGJ) or frozen concentrated clarified orange juice (FCCOJ) had a rich orange-yellow color similar to honey and had no noticeable aroma. Upon reconstitution of the concentrate to a single-strength juice, a desirable natural fruit skin color is yielded and it has no undesirable cooked-flavor. For example, reconstituted white grapefruit juice had a yellowish color and reconstituted colored grapefruit juice had a yellowish to pinkish color. Thus, a clarified grapefruit juice with a desirable natural color and flavor can be produced from yellow or otherwise colored grapefruit products (see Table 2).

TABLE 2

Color measurement values for 100% natural fruit juices.*

| Product | °Brix | Color CR | CY | N |
|---|---|---|---|---|
| Color changes by membrane process | | | | |
| Pink grapefruit juice (control) | 10 | 29.3 | 51.3 | 33.1 |
| Clarified pink grapefruit juice (Recon.)** | 10 | 22.9 | 55.6 | 32.5 |
| Clarified banana juice (Recon.) | 10 | 21.7 | 51.1 | 31.8 |
| Clarified strawberry juice (Recon.) | 8 | 214 | 78.9 | 66.6 |
| Debittered pink grapefruit (Recon.) | 10 | 25.3 | 46.4 | 31.8 |
| Typical commercial products | | | | |
| Orange juice (FCOJ) | 11.8 | 29.1 | 77.3 | 35.9 |
| Orange juice (FCOJ)(Acid reduced) | 11.8 | 29.4 | 78.8 | 36.1 |
| Orange juice (Recon.)(Bottled) | 11.8 | 30.4 | 76.7 | 36.1 |
| Orange juice (Pulp Free, Recon.) | 11.8 | 29 | 75.6 | 35.7 |
| Orange juice (NFC)(Brand A) | 11.1 | 23.9 | 68.9 | 34.1 |
| Orange juice (NFC)(Brand B) | 12 | 26.5 | 71.7 | 34.9 |
| Grapefruit juice (FCGJ) | 10.5 | 12.4 | 42.5 | 29.3 |
| Ruby red grapefruit juice (NFC) | 9.6 | 39.3 | 45.3 | 34 |
| White grapefruit juice (Recon.) | 10.6 | 10.4 | 38 | 28.5 |
| Guava-pineapple-strawberry (Recon.) | 12.3 | 58.8 | 47.4 | 37.5 |
| Orange-pineapple-banana (Recon.) | 12.3 | 21.2 | 58.5 | 32.5 |
| Apple juice (Recon.)(Bottled) | 11.8 | 60.2 | 85.2 | 41.9 |

*Measured by Hunter Colorimeter
**Reconstituted from concentrate

Frozen concentrated clarified grapefruit juice (FCCGJ) or frozen concentrated clarified orange juice (FCCOJ) had a rich orange-yellow color similar to honey and had no noticeable aroma. The well-known flavor restoration technique can be applied to prepare desirable flavor for consumer packs. Upon reconstitution of the concentrate to a single-strength juice, a desirable natural fruit skin color with desirable flavors is yielded and it has no undesirable cooked-flavor. For example, reconstituted white grapefruit juice had a yellowish color and reconstituted colored grapefruit juice had a yellowish to pinkish color. Thus, a clarified grapefruit juice with a desirable natural color and flavor can be produced from yellow or otherwise colored grapefruit products (see Table 2).

Since the viscosity is greatly reduced, the clarified juice concentrate at 63°–65° Brix is easy to pour at freezing temperatures. Based on the principles of freezing point depression and water activity reduction, the frozen concentrated clarified orange juice (FCCOJ) or frozen clarified grapefruit juice (FCCGJ) can be used for the preparation of 6+1 FCCOJ or 7+1 FCCGJ, ready to pour 100% natural citrus juice products at temperatures above −15° C. (see Table 3). This highly concentrated ready-to-pour product is novel and convenient. The reconstituted juice contains all the beneficial nutritional components of juice, i.e., sugars, minerals, vitamins, acids, and soluble color substances which render it desirable and appealing.

TABLE 3

A comparison of freezing points for various packaged frozen concentrated products.

| Products | Dilution Ratio Water: concentrate | Solids content °Brix | Freezing points °C. |
|---|---|---|---|
| Traditional 3 + 1 FCOJ | 3:1 | 42.0 | −5.0 to −6.4 |
| New 5 + 1 FCCOJ | 5:1 | 58.2 | −12.0 to −13.5 |
| New 6 + 1 FCCOJ | 6:1 | 65.7 | −18.0 to −20.0 |
| Traditional 3 + 1 FCGJ | 3:1 | 36.0 | −5.0 to −6.0 |
| New 6 + 1 FCCGJ | 6:1 | 57.4 | −13.0 to −14.0 |
| New 7 + 1 FCCGJ | 7:1 | 63.6 | −18.0 to −20.0 |

Any citrus or fruit juice may be subjected to the concentration method and system of the present invention, including orange, grapefruit, cranberry, blueberry, grape, apple, tangerine, pear, papaya, mango, pineapple, lemon, mixed-fruit juices and others. Other fruit purees such as apricot, banana and strawberry, and vegetable purees such as carrot and tomato can also be clarified and concentrated by the same method (see Table 2).

A detailed but non-limiting illustration of the method of the present invention, utilizing the system of the present invention follows:

EXAMPLE

Pink grapefruit juice concentrate at 64° Brix was reconstituted to a single-strength juice at 10° Brix and it was clarified by passing it through a SUPERCOR MF system (Kock Membrane System Inc., Wilmington, Mass.) (FIG. 1), which is specially designed for removing suspended solids for fruit juice applications. This part of the process completely separates the dissolved permeable solids from the pulpy juice to yield a clarified juice. The pectin, enzyme, and microbe content of the clarified juice is negligible. The clarified juice is then fed into a multiple-effect TASTE evaporator and concentrated under temperature and pressure conditions similar to those used in conventional techniques for the evaporation of citrus juices, but shorter periods of time are required to achieve higher concentrations.

The clarified juice concentrate does not contain the suspended solids found in pulpy juice, and due to it's low viscosity can be concentrated to a solids content (in terms of °Brix) greater than that of conventional pulpy juice concentrate. The same procedure was repeated, using banana puree and strawberry puree. A summary of test results comparing the conventional concentrate with the clarified permeate concentrate according to the invention is presented in Table 1 above.

Another example which illustrates the novel utility of the present invention is in the case of preparing a grapefruit based blended product having lower bitterness than conventional grapefruit juice. As is well known, grapefruit juice contains limonin and naringin which impart a bitter flavor to the juice. Conventional techniques for reducing the bitterness of grapefruit juice involve a membrane-adsorption technique, and are expensive. The debittering resin also adsorbs flavor and color compounds. Thus, the clarified permeate suffers a loss of desirable flavors and natural color. The concentration of limonin in the ready to drink grapefruit juice was approximately 5–10 ppm. It is well known that banana puree does not have a bitter flavor. It may seem logical to try to mix banana puree with grapefruit juice to reduce the final concentration of limonin and naringin to non-detectable or at least acceptable levels. However, banana puree prepared by conventional methods can not be sufficiently concentrated to make it possible to prepare a 50/50 grapefruit/banana juice concentrate, as would be necessary to reduce the bitterness to the desired levels. Previous attempts to mix a banana pure with grapefruit juice to reduce bitterness resulted in a grapefruit juice which was so thick as to be more in the nature of a soup than a juice.

A banana/grapefruit juice produced in accordance with the present invention, on the other hand, is sufficiently low in viscosity as to be capable of being concentrated for storage, and can be reconstituted to a refreshing juice low in acidity and sweet taste (see Table 4 for lower % acid and higher Brix/% acid ratio). A further advantage of such a juice is that the clarified banana juice, produced in accordance with the present invention, exhibits a yellow color when reconstituted (see Table 2). This yellow color, in addition to the yellow color of the grapefruit juice, is attractive and pleasant to the consumer. A banana/grapefruit mixture produced in accordance with conventional methods produces a cloudy grey-to-tan juice which is not appealing.

TABLE 4

Quality characteristics of 100% natural fruit juices

| Product | °Brix | % acid | Ratio | pH |
|---|---|---|---|---|
| Traditional 3 + 1 frozen concentrate | | | | |
| FCOJ Brand A (Premium) | 11.8 | 0.77 | 15.3 | 3.73 |
| FCOJ Brand B (Premium) | 11.8 | 0.72 | 16.4 | 3.94 |
| FCOJ Brand B (Reduced acid) | 11.8 | 0.56 | 21.1 | 4.07 |
| FCGJ Brand B | 10.2 | 1.10 | 10.4 | 3.27 |
| Apple juice | 11.8 | 0.25 | 47.2 | 3.80 |
| Grape juice | 15.2 | 0.45 | 33.8 | 3.45 |
| Traditional Chilled RTS Juice | | | | |
| Orange juice | 10.7 | 0.7 | 15.2 | 3.72 |
| Grapefruit juice | 9.8 | 0.98 | 10.2 | 3.40 |
| Clear Juice and Aloe-Juice Blends of This Invention | | | | |
| Banana juice (BA) | 10.0 | 0.09 | 113.5 | 5.20 |
| Orange Juice (OJ)* | 11.8 | 0.61 | 19.3 | 3.91 |
| 90% OJ + 10% BA | 11.8 | 0.56 | 21.1 | 3.93 |
| 80% OJ + 20% BA | 11.8 | 0.50 | 23.6 | 4.03 |
| 70% OJ + 30% BA (with 10% Aloe) | 11.8 | 0.45 | 26.2 | 4.11 |
| Grapefruit Juice (GJ)** | 10.0 | 0.87 | 11.5 | 3.41 |
| 90% GJ + 10% BA | 10.0 | 0.79 | 12.7 | 3.47 |
| 80% GJ + 20% BA | 10.0 | 0.70 | 14.3 | 3.59 |
| 70% GJ + 30% BA (with 10% Aloe) | 10.0 | 0.60 | 16.7 | 3.69 |

*Off-grade orange
**Pink grapefruit

The clear sweet banana juice obtained in accordance with the present invention can be used not only for blending with grapefruit juice, i.e., the permeate, but it can also be blended with the pulpy retentate. The retentate contains "cooked" flavors and also contains limonin and naringin, and is thus somewhat bitter, which may not be desirable where the retentate is to be used in a dietary product. Combining sweet clarified banana juice with grapefruit retentate will lower the limonin concentration to a level below the level considered objectionable.

Accordingly, the method and system of the present invention offers advantages over previously described methods and systems. It is significant that the clarified juice, preferably citrus juice, can be prepared and packaged as a ready to pour high density concentrate for storage in a domestic freezer, e.g., 6+1 FCCOJ or 6+1 FCCGJ, as compared to conventional 3+1 FCOJ or FCGJ pulpy juice products or other 3+1 juice products which freeze at the same temperatures and are not ready to pour (see Table 3 and Table 4).

The concentrated or reconstituted juices may be used as ingredients in mixed juice drinks, mixed alcoholic drinks such as tropical fruit punches, or in naturally flavored carbonated soft drinks.

The pulpy retentate may be used in any number of applications such as fillers for baking in baking products, for adding pulp to soft drinks, as dietary roughage supplements, for adding body to food products or dietary desert products, etc. A grapefruit retentate may have a slightly bitter flavor. This bitterness can be overcome by either adding an artificial sweetener (in the case that the product is to remain low calorie) or by adding a clear sweet juice such as a banana juice obtained in accordance with the present invention. The product may then be used as a paste or dried.

Recently, it has become popular to incorporate aloe, or aloe vera, into fruit juice compositions for enhancing the natural healthy properties of juice. Aloe vera has been used for over 2,000 years for a number of remedial applications. Aloe vera is known to have anti-bacterial properties, as disclosed by Lorenzetti, et. al., J. Pharm. Sci. 53, 1287 (1964).

Aloe vera is a plant material derived from the leaves of one or more species of aloe. A list of species of aloe which have therapeutic value can be found in U.S. Pat. No. 4,646,029 (Grollier et al), the entire text of which is incorporated herein by reference.

U.S. Pat. No. 3,892,853 teaches a process for preparing stabilized aloe gel, and U.S. Pat. No. 4,179,372 (Coats) teaches a process for stabilizing aloe vera gel comprising oxidizing the gel under heat, and adding ascorbic and citric acids. U.S. Pat. No. 5,118,673 (Carpenter et al) provides an extensive discussion of the history, biological properties, and pharmacy of aloe products, the entire text of which is incorporated herein by reference.

The composition and manner of action of aloe vera is not fully understood. It has been reported that steroids and wound healing hormones may be contained in aloe vera, but it is more commonly believed that the moisturizing emollient and healing properties of aloe vera are due to the polysaccharides present, or to synergistic effects of the polysaccharides and other substances present in the gel. Leun, A.; Effective Ingredients of Aloe Vera, Drugs & Cosmetics, June 1977, pp. 34–5 and 154–5.

The term "aloe" as used herein generally refers to the viscous gel of the internal portion of the leaf of plants of the genus aloe, and preferably of the species Aloe Vera (e.g., Aloe Vera Linne), *Aloe barbadensis* Miller, known in commerce as Curacao Aloe, or of *Aloe ferox* Miller and hybrids of this species with *Aloe africana* Miller and *Aloe spicata* Baker, known in commerce as Cape Aloe (Fam. Liliaceae). The gel may be in the form of a liquid concentrate from which water has been removed from gel which has been freshly extracted from the leaf of Aloe Vera and to which preservatives have been added to preserve the therapeutic qualities of the gel.

A suitable aloe vera gel (concentrate) is commercially available from Florida Food Products, Inc., 2231 W. Highway 44, Eustis, Fla. 32727-1300. The inner gel (fillet) of freshly harvested leaves of the Aloe Vera Barbadensis Miller variety is carefully removed to minimize disruption of the Aloin layer (aloin being a thick, mucilaginous yellow juice, which is to be distinguished from the clear gel of aloe vera which is preferably employed in the present invention). The gel is next further processed to remove pulp and fiber. The resultant gel is then pasteurized and preserved to maintain its efficacy. Finally, the gel is concentrated utilizing low temperature evaporation to produce concentrates, and "decolorized" to remove color bodies and reduce the odor to ensure color stability and minimize the aloe's inherent pungency.

Products of commercial aloe vera concentrates suitable for use in the present invention include "Aloe Vera Decolorized 10×" (i.e., ten-times concentrate), a water-soluble colorless liquid with a slight vegetable odor, a boiling point of 100° C., and a specific gravity at 25° C. of 1.02, and "Aloe Vera Decolorized 40×" (i.e., 40 times concentrate), a water-soluble yellow to amber liquid with a moderate vegetable odor, a boiling point of 100° C., and a specific gravity at 25° C. of 1.11. Further details of the product are discussed in U.S. Pat. No. 4,593,046 (Gruber), the text of which is incorporated herein by reference.

Other forms of aloe which may be used include an extract from the dried leaves of Aloe Vera plant as described in U.S. Pat. No. 4,857,328 (Trenzeluk). Trenzeluk teaches a skin therapeutic mixture comprising the Aloe Vera plant extract, a preservative such as a sulfathiazole, an oil such as stearic acid or cetyl alcohol or glycerol monostearate, and an oil-soluble base such as petrolatum.

The aloe vera may be omitted or used in any amount, preferably 5 to 35 wt %, most preferably in an amount which would correspond to 10 to 20 wt % of reconstituted aloe vera. That is, the addition of 0.25% of 40× concentrate would correspond to addition of 10 wt % of reconstituted (unconcentrated) aloe vera gel (see Table 4).

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

Although the invention was described herein in great detail with respect to processing of citrus juice, it will be readily apparent to those working in the art that the process is capable of use in a number of other applications, such as processing of apple juice, berry juice, watermelon juice, kiwi fruit juice, etc. Although this invention has been described in its preferred form with a certain amount of particularity with respect to a specific illustrative embodiment as shown in the figure, it is understood that the present disclosure of the preferred form has been made only by way of example and that numerous changes in the details of structures and the composition of the combination may be resorted to without departing from the spirit and scope of the invention.

Now that the invention has been described,
What is claimed is:

1. A packaged clarified juice concentrate produced by a process comprising the steps of:
   (A) subjecting pulpy fruit puree, a vegetable puree or a juice reconstituted from concentrate to ultrafiltration to form a retentate fraction comprising substantially all of the suspended solids and a permeate fraction comprising clarified juice including soluble solids;
   (B) concentrating said permeate fraction to form a concentrate at approximately 60°–75° Brix,
   (C) adding flavor to the product of step (B), and
   (D) packaging said concentrate.

2. A packaged clarified juice concentrate as in claim 1, wherein said concentrating in step (B) is by means of a high temperature short time evaporator.

3. A packaged clarified juice concentrate as in claim 1, wherein said juice reconstituted from concentrate in step (A) is a juice prepared from a fruit selected from the group consisting of orange, grapefruit, cranberry, blueberry, grape, apple, tangerine, pear, papaya, mango, pineapple, lemon, and mixtures thereof.

4. A packaged clarified juice concentrate as in claim 1, wherein said pulpy fruit puree or vegetable puree in step (A) is a pulpy fruit puree or vegetable puree prepared from a fruit or vegetable selected from the group consisting of apricot, banana, strawberry, carrot, celery, and tomato.

5. A packaged clarified juice concentrate as in claim 1, wherein said packaged concentrate of step (D) is at approximately 60°–65° Brix.

6. A packaged clarified juice concentrate as in claim 1, wherein the freezing point of said packaged concentrate is below −10° C.

7. A packaged clarified juice concentrate as in claim 1, wherein the freezing point of said packaged concentrate is below −15° C.

8. A packaged clarified juice concentrate as in claim 1, wherein said packaged clarified juice concentrate further includes aloe vera extract.

9. A packaged clarified juice concentrate as in claim 8, wherein the concentration of aloe vera in said packaged clarified juice concentrate corresponds to 5–15% of aloe vera at non-concentrate strength.

10. A packaged clarified juice concentrate as in claim 1, wherein said ultrafiltration step employs a membrane filter with a molecular weight cutoff (MWCO) in the range of $5 \times 10^4$ to $1 \times 10^5$.

11. A packaged clarified juice concentrate as in claim 1, further including, mixing said clarified juice concentrate with a non-clarified fruit juice.

12. A packaged clarified juice concentrate as in claim 1, wherein said packaged clarified juice concentrate includes grapefruit juice concentrate and clarified banana concentrate.

13. A method for preparing a fruit juice, said method comprising:
   (A) processing pulpy fruit puree or vegetable puree or reprocessing a juice reconstituted from concentrate by ultrafiltration to form a permeate and a retentate fraction, and evaporative concentration of said permeate fraction into a clarified juice concentrate at 60°–75° Brix;
   (B) adding flavor to the product of step (A),
   (C) packaging said clarified juice concentrate at 60°–65° Brix;
   (D) storing said clarified juice a temperature between −5° C. and −15° C.; and
   (E) mixing said clarified juice at a temperature between −5° C. and −15° C. with water to produce said fruit juice.

* * * * *